United States Patent
Stan et al.

(10) Patent No.: US 12,034,626 B2
(45) Date of Patent: Jul. 9, 2024

(54) METHODS, SYSTEMS, AND COMPUTER READABLE MEDIA FOR USING A PROGRAMMABLE PROCESSING PIPELINE DEVICE TO EXECUTE SCALABLE CONNECTIONS PER SECOND (CPS) GENERATION TEST AND AN APPLICATION REPLAY SEQUENCE TEST

(71) Applicant: Keysight Technologies, Inc., Santa Rosa, CA (US)

(72) Inventors: Razvan Ionut Stan, Agoura Hills, CA (US); Thomas Ameling, Woodland Hills, CA (US); Lyle Eugene Thompson, Mentone, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 17/966,743

(22) Filed: Oct. 14, 2022

(65) Prior Publication Data
US 2024/0129219 A1   Apr. 18, 2024

(51) Int. Cl.
*H04L 43/50* (2022.01)
*H04L 12/54* (2022.01)
(Continued)

(52) U.S. Cl.
CPC ............ *H04L 43/50* (2013.01); *H04L 43/045* (2013.01); *H04L 43/0894* (2013.01);
(Continued)

(58) Field of Classification Search
CPC ......... H04L 12/54; H04L 12/56; H04L 41/14; H04L 41/145; H04L 41/122;
(Continued)

(56) References Cited

U.S. PATENT DOCUMENTS

| | | | |
|---|---|---|---|
| 9,306,816 B2 * | 4/2016 | Jana | H04L 43/18 |
| 10,652,154 B1 * | 5/2020 | Matthews | H04L 43/0817 |

(Continued)

FOREIGN PATENT DOCUMENTS

| | | | | |
|---|---|---|---|---|
| CN | 107294802 A | * | 10/2017 | H04L 41/145 |
| CN | 115114132 A | * | 9/2022 | |

OTHER PUBLICATIONS

Gomez et al., "A Survey on TCP Enhancements using P4-programmable Devices," Computer Networks, vol. 212, pp. 1-40 (Jul. 2022).

(Continued)

*Primary Examiner* — Glenton B Burgess

(57) ABSTRACT

A method for using a programmable processing pipeline to implement an application replay sequence test or a scalable CPS generation test includes obtaining a sequence replay definition code package from a sequence relay definition storage element and converting the sequence replay definition code package into a hardware configuration image. The method further includes provisioning the hardware configuration image on at least one programmable processing pipeline device, causing the at least one programmable processing pipeline device to implement a test session connection initiator and a test session receiver, and utilizing the hardware configuration image to establish a first test session connection from the test session connection initiator and the test session connection receiver through a system under test (SUT). The method also includes conducting a programmable application replay sequence test or a scalable CPS generation test through the SUT using definition information contained in the hardware configuration image.

18 Claims, 5 Drawing Sheets

(51) Int. Cl.
*H04L 43/045* (2022.01)
*H04L 43/0894* (2022.01)
*H04L 47/34* (2022.01)
*H04L 49/00* (2022.01)

(52) U.S. Cl.
CPC .......... *H04L 49/3063* (2013.01); *H04L 12/54* (2013.01); *H04L 47/34* (2013.01)

(58) Field of Classification Search
CPC . H04L 41/0886; H04L 41/0806; H04L 43/50; H04L 43/045; H04L 43/0894; H04L 43/106; H04L 43/16; H04L 43/0852; H04L 43/04; H04L 43/028; H04L 47/34; H04L 49/111; H04L 49/15; H04L 49/9068; H04L 49/3063

See application file for complete search history.

(56) References Cited

U.S. PATENT DOCUMENTS

| | | |
|---|---|---|
| 11,388,078 B1 | 7/2022 | Sommers |
| 11,388,079 B1 * | 7/2022 | Ramabadran ........... H04L 63/14 |
| 11,392,485 B2 * | 7/2022 | Kumar .................. G06F 18/217 |
| 11,595,289 B2 * | 2/2023 | Lee ......................... H04L 43/50 |
| 2009/0287791 A1 * | 11/2009 | Mackey .............. G06F 11/3414 |
| | | 709/209 |
| 2013/0305090 A1 * | 11/2013 | Kristiansen ......... H04L 41/0843 |
| | | 714/35 |
| 2016/0205008 A1 * | 7/2016 | Dasu ................... H04L 43/0888 |
| | | 709/224 |
| 2020/0313999 A1 | 10/2020 | Lee et al. |

OTHER PUBLICATIONS

Atutxa et al., "Achieving Low Latency Communications in Smart Industrial Networks with Progammable Data Planes," Sensors, vol. 21, No. 5199, pp. 1-20 (2021).
Ghasemi et al., "Dapper: Data Plane Performance Diagnosis of TCP," SOSR'17, pp. 1-14 (Apr. 3-4, 2017).
Zhang, Dai et al., "HyperTester: High-Performance Network Testing Driven by Programmable Switches," IEEE/ACM Transactions on Networking, vol. 29, No. 5, pp. 2005-2018 (Oct. 2021).
Combined Search and Examination Report for GB Application No. 2315627.6 (Apr. 2, 2024).

* cited by examiner

METHODS, SYSTEMS, AND COMPUTER READABLE MEDIA FOR USING A PROGRAMMABLE PROCESSING PIPELINE DEVICE TO EXECUTE SCALABLE CONNECTIONS PER SECOND (CPS) GENERATION TEST AND AN APPLICATION REPLAY SEQUENCE TEST

TECHNICAL FIELD

The subject matter described herein relates to network testing. More specifically, the subject matter relates to methods, systems, and computer readable media for utilizing a programmable processing pipeline device to execute a highly scalable CPS generation test and an application replay sequence test.

BACKGROUND

Telecommunications network component manufacturers have traditionally produced custom hardware devices comprising a chassis with customized blade compute elements. Each physical blade compute element can be designed to support various protocols, hardware acceleration functionalities, network security features, and the like. However, these hardware components are usually designed with features that in many instances are limited or too restrictive for a network operator's test applications. For example, if a customer network requires a particular use case test (e.g., a connections per second (CPS) generation test, traffic mixing test, traffic generation test, etc.) for a network device that is equipped with considerable number of ports, then many traditional test cards may be required to satisfactorily test the network element. Specifically, simultaneously testing all of a network device's 32 ports to determine their collective CPS generation capability would require an costly test arrangement if each physical test card were only equipped with two ports. Moreover, such physical port limitations may compel network testers to perform less than ideal network tests (e.g., run a "snake" test where the two ports of a test card are used to test/load the 32 ports of a DUT via a snake cable running to each of the other 30 ports). In addition to the physical limitations associated with their use, deploying customized physical hardware components for each of several different network traffic tests can become cost prohibitive for network operators in many testing scenarios.

Accordingly, a need exists for methods, systems, and computer readable media for utilizing a programmable processing pipeline device to execute a highly scalable CPS generation test and an application replay sequence test.

SUMMARY

Methods, systems, and computer readable media for utilizing a programmable processing pipeline device to execute a scalable CPS generation test and/or an application replay sequence test are provided. One exemplary method includes obtaining a sequence replay definition code package from a sequence relay definition storage element, converting the sequence replay definition code package into a hardware configuration image, and provisioning the hardware configuration image on at least one programmable processing pipeline device, where the hardware configuration image causes the at least one programmable processing pipeline device to implement a test session connection initiator and a test session connection receiver. The method further includes utilizing the hardware configuration image to establish a first test session connection between the test session connection initiator and the test session connection receiver through a system under test (SUT) and conducting a programmable application replay sequence test or a scalable CPS generation test through the SUT using definition information contained in the hardware configuration image.

According to another aspect of the method described herein, the at least one programmable processing pipeline device is configured to log and report results of the programmable application replay sequence test or the scalable CPS generation test.

According to another aspect of the method described herein, the sequence replay definition code package includes P4 source code or NPL source code.

According to another aspect of the method described herein, modifying source identification information and destination identification information in a test packet communicated between a transmitting engine and a responding engine in the at least one programmable processing pipeline device prior to the test packet being communicated by either the transmitting engine or the responding engine to the SUT via the processing pipeline.

According to another aspect of the method described herein, the source address information includes one or more of source media access control code (MAC) address information, source Internet protocol (IP) address information, and/or source transport layer port information and the destination address information includes one or more of destination MAC address information, destination IP address information, and/or destination transport layer port information.

According to another aspect of the method described herein, conducting a programmable application replay sequence test or a scalable CPS generation test includes updating a TCP sequence number and a TCP acknowledgement number in the test packet and recalculating a checksum value in the test packet.

According to another aspect of the method described herein, the first test session connection is modified by control commands or instructions issued from a test controller via a control interface associated with the at least one programmable processing pipeline device.

According to another aspect of the method described herein, a second test session connection is initiated using a least a portion of a test packet that terminates a first test session connection.

According to another aspect of the method described herein, the at least one programmable processing pipeline device includes a switching application-specific integrated circuit (ASIC) or a programmable switching chipset.

According to another aspect of the subject matter described herein, a system includes a distributed test system platform including at least one processor and a memory. The system further includes a test engine stored in the memory and when executed by the at least one processor is configured to: obtain a sequence replay definition code package from a sequence relay definition storage element, convert the sequence replay definition code package into a hardware configuration image, and provision the hardware configuration image. The system also includes at least one programmable processing pipeline device configured to: receive the hardware configuration image from the test engine, wherein the hardware configuration image causes the at least one programmable processing pipeline device to implement a test session connection initiator and a test session connection receiver, utilize the hardware configuration image to establish a first test session connection between the and the test session connection receiver through a SUT and conduct a programmable application replay sequence test through the SUT using definition information contained in the hardware configuration image.

According to another aspect of the system described herein, the at least one programmable processing pipeline device is configured to log and report results of the programmable application replay sequence test.

According to another aspect of the system described herein, the sequence replay definition code package includes P4 source code or NPL source code.

According to another aspect of the system described herein, the at least one programmable processing pipeline device is further configured to modify source address information and destination address information in a test packet communicated between the test session connection initiator and the test session connection receiver in the at least one programmable processing pipeline device prior to the test packet being communicated by either the test session connection initiator or the test session connection receiver through the SUT via the first test session connection.

According to another aspect of the system described herein, the source identification information includes one or more of source media access control code (MAC) address information, source Internet protocol (IP) address information, and/or source transport layer port information and the destination information includes one or more of destination MAC address information, destination IP address information, and/or destination transport layer port information.

According to another aspect of the system described herein, the at least one programmable processing pipeline device is further configured to update a transport layer sequence number and a transport layer acknowledgement number in the test packet and recalculating a checksum value in the test packet.

According to another aspect of the system described herein, the first test session connection is modified by control commands or instructions issued from a test controller via a control interface associated with the at least one programmable processing pipeline device.

According to another aspect of the system described herein, the at least one programmable processing device is configured to initiate a second test session connection via the SUT after a first test session connection is terminated by generating a packet for initiating the second test connection using at least a portion of a test packet that terminates the first test session connection.

According to another aspect of the system described herein, the at least one programmable processing pipeline device includes a switching application-specific integrated circuit (ASIC) or a programmable switching chipset.

The subject matter described herein may be implemented in software in combination with hardware and/or firmware. For example, the subject matter described herein may be implemented in software executed by a hardware based processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'device' refers to a physical computing platform including one or more processors, network interfaces, and memory.

As used herein, each of the terms 'function', 'engine', and 'manager' refers to software and/or firmware that is stored in memory and when executed by a hardware processor executes the function(s) being described.

BRIEF DESCRIPTION OF THE DRAWINGS

The subject matter described herein will now be explained with reference to the accompanying drawings of which.

DETAILED DESCRIPTION

Figure 1:
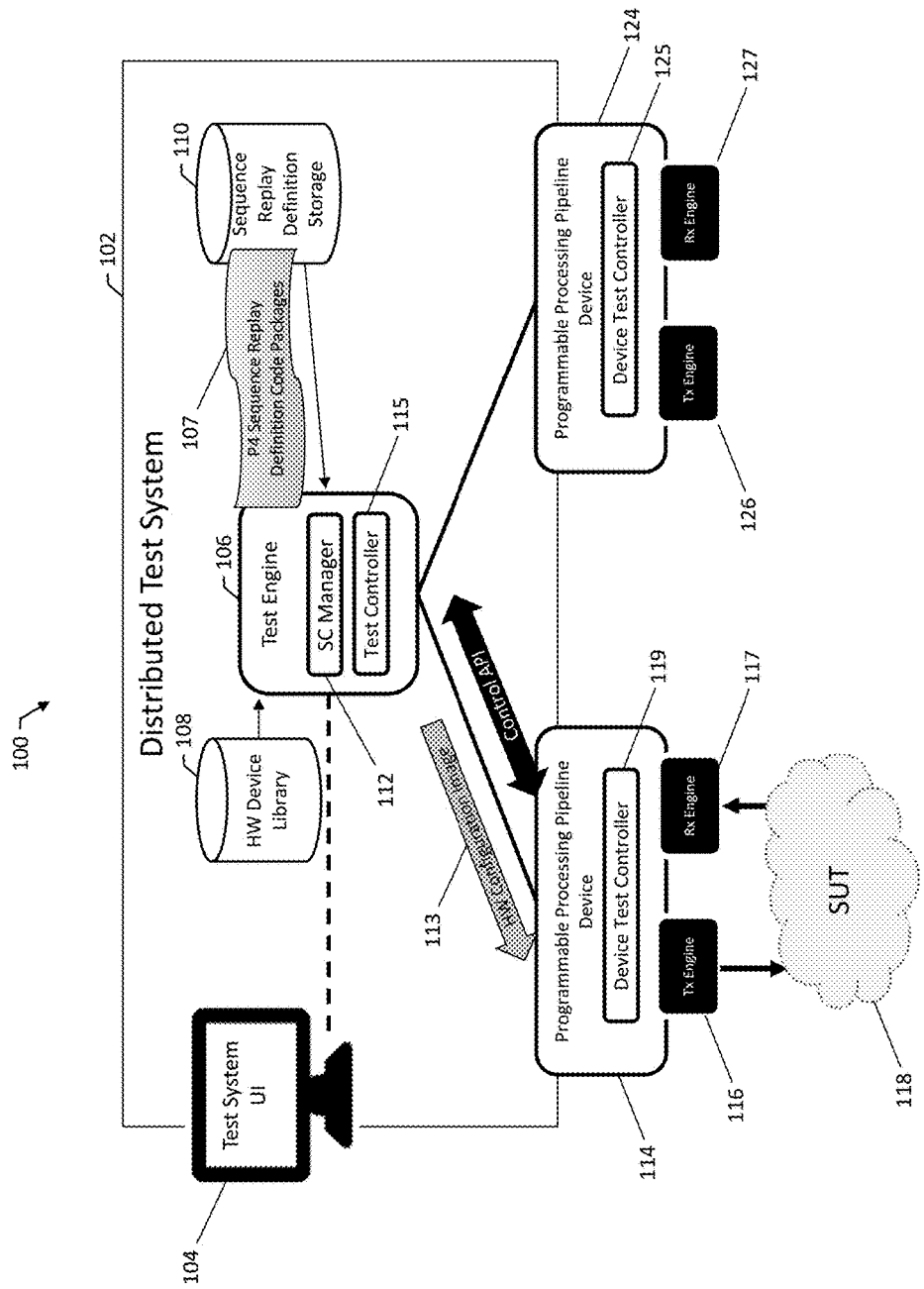
FIG. 1 is a block diagram illustrating an exemplary distributed test system deploying a single test session connection.

This disclosed subject matter describes methods, systems, and computer readable media for utilizing a programmable processing pipeline device to execute an application replay sequence test. FIG. 1 is a diagram illustrating an example test environment 100 that includes a distributed test system 102 (e.g., a distributed test system platform) configured for testing at least one system under test (SUT) 118 and/or device under test (DUT). Specifically, distributed test system 102 may represent any suitable entity or entities (e.g., one or more computing platforms, nodes, or devices) associated with testing SUT 118 (e.g., one or more application servers, one or more network controllers, one or more connection tracking elements, etc.). For example, distributed test system 102 may utilize one or more programmable processing pipeline devices (e.g., programmable processing pipeline device 114 or programmable processing pipeline device 124) to generate and send packet traffic to SUT 118 and/or receive packet traffic from SUT 118. As described herein, the test system and/or the programmable processing pipeline devices can be configured to analyze one or more performance aspects associated with SUT 118. In some embodiments, distributed test system 102 is a P4 programmable based distributed test system. However, the subject matter described herein is not limited to the P4 programming language. Any programming language (e.g., NPL, JSON, XML, etc.) usable to configure a programmable processing pipeline device is intended to be within the scope of the subject matter described herein.

As shown in FIG. 1, distributed test system 102 may include a test engine 106, a test system user interface (UI) 104, a hardware device library 108, and a sequence replay definition storage element 110. In some embodiments, test system user interface 104 may comprise a graphical user interface (GUI) that can be displayed on a user device, such as a personal computer, laptop computer, tablet computer, smartphone, or the like. Notably, test system user interface 104 can include any electronic display interface that is configured for accepting user input and displaying test system results. Test system user interface 104 can be utilized by a network operator to access, provision and/or modify the data entries respectively stored in hardware device library 108 and sequence replay definition storage element 110.

Likewise, test system user interface 104 can be utilized by a network operator to control and/or operate test engine 106. For example, test system UI 104 may include a web based GUI for receiving a test operator's input for setting up or configuring testing scenarios and/or programmable pipeline test devices. In one example, the GUI can be used to visually depict a programmable pipeline topology facilitated by the elements of one or more programmable processing pipeline devices. In another example, the GUI can be used to gather test session settings and/or other information for provisioning the test engine and/or programmable processing pipeline devices.

In some embodiments, distributed test system 102 may also include sequence replay definition storage element 110, which can include any data storage structure, such as a database table that is configured to store and provide access to programmable ASIC code files (e.g., P4 source code or NPL source code) and/or packages associated with test packet sequence replay definitions. For example, the P4 source codes files may include application flow definitions that can be selected by test engine 106 to form various P4 sequence replay definition code packages. In some embodiments, the test packet sequence replay definitions can be collected into one or more sequence replay definition code packages 107 that are requested by a test operator via test engine 106. In particular, a sequence replay definition code package include source code (e.g., P4 source code) definitions that may define a sequence of packets that is to be replayed (e.g., by a programmable processing pipeline device) to test a SUT with a particular protocol.

In some embodiments, distributed test system 102 may also be provisioned with hardware device library 108. The hardware device library 108 may include a data storage element or structure that contains hardware device specification information that is used by source code manager 112 to compile and/or fit a processing pipeline image (i.e., hardware configuration image that is derived from a compiled sequence replay definition code package) on a programmable processing pipeline device. Further, hardware device library 108 may be configured to store identifiers corresponding to each of the various hardware components associated with a system test.

In some embodiments, test engine 106 may include a source code (SC) manager 112 that is configured for receiving instructions from test system UI 104 and accessing sequence replay definition storage element 110 to obtain stored sequence replay definition code package(s). For example, source code manager 112 may be an ASIC source code manager configured to access and/or send a request message to sequence replay definition storage element 110 (per network operator instructions) to obtain at least one source code package. In some embodiments, the source code package along with profile definitions are included in a P4 sequence replay definition code package 107 that is received and/or obtained from sequence replay definition storage element 110. As used herein, replay definitions can be used to specify the configuration parameters and/or packet replay sequence order for a particular testing profile. In some embodiments, source code manager 112 may also be configured to update the device-specific configuration metadata and parameters of a replay definition and/or source code package stored in sequence replay definition storage element 110.

After receiving the source code package (e.g., sequence replay definition code package 107) from sequence replay definition storage element 110, source code manager 112 is configured to process and/or compile the source code package(s) to generate an executable hardware configuration image file. In some embodiments, source code manager 112 includes a compiler component that receives sequence replay definitions (e.g., included in a P4 sequence replay definition code package 107) and outputs the hardware configuration image (e.g., programmable device profiles) that includes object code, which is directly executable by the programmable processing pipeline device (e.g., a P4 programmable processing pipeline device). Notably, the hardware configuration image data can be used to configure the programmable processing pipeline device to implement desired testing functions and defines the approach (e.g., topology) that the processing pipeline is established between the pipeline device and the SUT/DUT. The hardware configuration data also includes sequence replay definitions that define the manner and/or the order that the test packets are to be replayed via the one or more test session connections. Source code manager 112 and/or its compiler component also outputs metadata (e.g., also derived from received sequence replay definition code package 107) that describes a programmable processing pipeline device. profile. Alternatively, source code manager 112 may include a metadata generator (not shown) that generates metadata from text, such as comments included in the source code (e.g., P4 sequence replay definition code package).

In some embodiments, hardware configuration image 113 may include an image file that contains controlling information that is recognized and executable by a programmable processing pipeline device. Notably, source code manager 112 can process the executable instructions to generate an executable hardware configuration image that includes the instructions for one or more programmable processing pipeline devices (and sequence replay definitions). Source code manager 112 may also be adapted to send and/or fit the executable image file onto one or more programmable processing pipeline devices associated with distributed test system 102. Further, after source code manager 112 delivers and/or fits an executable configuration image onto programmable processing pipeline devices 114 and/or 124, the local device test controller(s) may utilize the hardware configuration data to establish one or more P4 test packet programmable processing pipelines for SUT testing. For example, the programmable processing pipeline device and/or its device test controller is configured to store the hardware configuration image 113 (e.g., programmable processing pipeline device source code and a plurality of different programmable processing pipeline device profile definitions containing parameters for implementing different programmable processing pipeline device profile variations) in a local data storage. For example, programmable processing pipeline device 114 may store source code, such as P4 source code, and profile definitions, such as IP lookup table configurations, packet filter rules, etc. in the device's local data storage.

In some embodiments, hardware configuration image 113 includes one or more P4-based sequence replay definitions. As used herein, the sequence replay definition includes one or more replay sequence identifier values (e.g., binary, hex, ascii, etc.) that are associated with each message and/or packet in a replay sequence (e.g., originally specified in the sequence replay definition code package). When loaded or provisioned into a processing pipeline(s) supported by a programmable processing pipeline device, the device and/or its device test controller is configured to insert specified replay sequence identifiers into the test packets associated with a replay sequence of packets. Moreover, these sequence identifier values can be used by the P4 pipeline elements (e.g., device test controller, transmitting engine, and/or receiving engine as discussed in greater detail below) to facilitate the processing and/or generation of test packets for the replay sequence executed using the processing pipeline.

It will be appreciated that a P4-based sequence replay definition may include, as part of the definition, packet content information (e.g., header and/or payload content and/or content diff information, etc.) associated with test packets in the replay sequence. Although the use of P4 programming language is described herein, it will be appreciated that the contemplated embodiments of the disclosed subject matter may include programmable ASICs and ASIC programming languages other than P4 (e.g., Broadcom NPL, XML, JSON, etc.).

In FIG. 1, an exemplary programmable processing pipeline device is depicted as programmable processing pipeline device 114. In some embodiments, programmable processing pipeline device 114 may include a programmable switch device, a P4-programmable smartnic/data processing unit (DPU), a programmable smart network interface controller (NIC), a programming switching ASIC, or any other hardware programmable processing device, chipset, or component (e.g., a P4 programmable device or a non-P4 programmable device) that is configured to receive configuration image files from test engine 106 and/or source code manager 112. For example, exemplary programmable processing pipeline devices may include, but are not limited to, Barefoot/Intel Tofino, Broadcom Trident4, and Mellanox Spectrum II/III devices. In some embodiments, programmable processing pipeline device 114 may be any device that includes a fine-grained resource pool and extremely flexible pipeline configuration(s). For example, if a P4 program or NPL program is compiled, and the output (e.g., object code and other artifacts) is loaded onto the programmable processing pipeline device to configure the on-chip resources and thereby execute the user's data plane program, a nearly infinite range of solutions in the form of build profiles is possible.

As shown in FIG. 1, test engine 106 also includes a test controller 115 configured to orchestrate and monitor the SUT test (or DUT test) via an issuance of a command and/or control instruction communicated to the P4 processing pipeline(s) via device test controller(s) associated with programmable processing pipeline device 114. More specifically, the control instructions can be issued to the programmable processing pipeline device via a test system command and control interface (e.g., a control API). Further, test controller 115 can be configured to collect and report test results that are received from the device test controller hosted by each programmable processing pipeline device conducting a test.

As indicated above, test system 102 further includes programmable processing pipeline devices 114 and 124. Although two devices are depicted in FIG. 1, it is understood that test system 102 may be configured with additional devices without departing from the scope of the disclosed subject matter. Programmable processing pipeline device 114 may include a transmitting engine 116 and a receiving engine 117, each of which is configured to communicate with the other engine via SUT 118 in order to establish one or more test session connections through SUT 118. Likewise, programmable processing pipeline device 124 may include a transmitting engine 126 and a receiving engine 127, each of which is configured to communicate with the other engine via an SUT or DUT being tested by the programmable processing pipeline device. In one example, each transmitting engine 116 an 126 functions as a test session connection initiator, such as a TCP connection initiator, and each receiving engine 117 and 127 functions as a test session connection receiver, such as a TCP connection receiver. Additional details regarding an exemplary architecture and/or functionality of the programmable processing pipeline device(s) is described below and depicted in FIG. 2.

Figure 2:
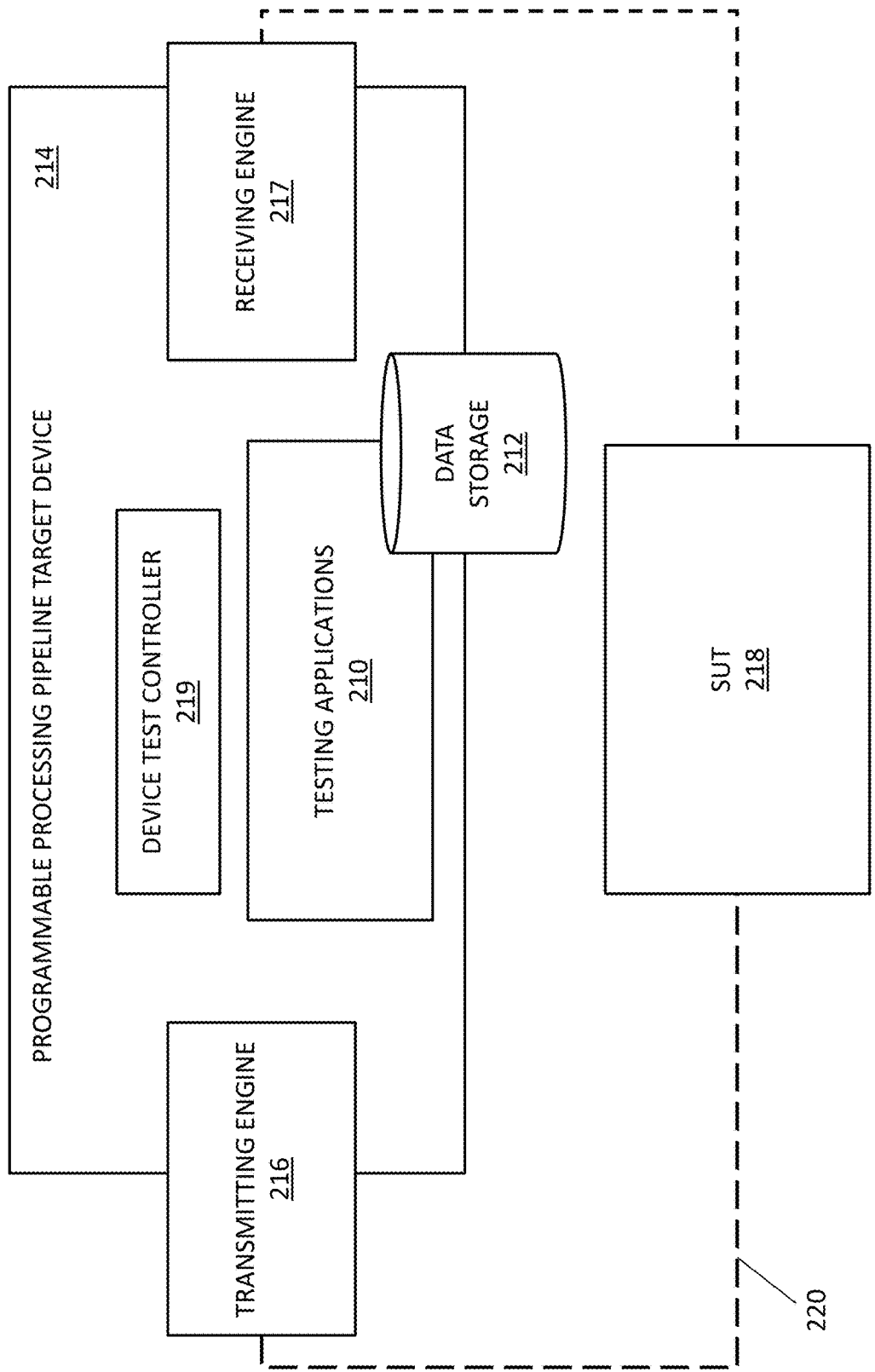
FIG. 2 is a diagram illustrating an exemplary programmable processing pipeline device.

In FIG. 2, an exemplary programmable processing pipeline device 214 is shown. Notably, each of programmable processing pipeline device 114 and 124 illustrated in FIG. 1 may be similarly represented by programmable processing pipeline device 214 shown in FIG. 2. For example, programmable processing pipeline device 214 may include a device test controller 219, a transmitting engine 216, a receiving engine 217, one or more testing applications 210 that are used to conduct testing over the established test session connections, and a data storage element 212. FIG. 2 further depicts a SUT 218, which is not unlike the SUTs depicted in FIG. 1.

In some embodiments, device test controller 219 may be any suitable entity or entities (e.g., software executing on a processor, a field-programmable gateway array (FPGA), and/or an ASIC, or a combination of software, an FPGA, and/or an ASIC) for performing one or more aspects associated with testing SUT 218 and/or various aspects thereof. In some embodiments, device test controller 219 may be implemented using one or more processors and/or memory. For example, device test controller 219 may utilize one or more processors (e.g., executing software stored in memory) to configure processing pipelines to implement traffic patterns, connections, and/or scenarios for various message streams (e.g., flows or sessions) based on the received hardware configuration image received from test engine 106 (as shown in FIG. 1). In another example, device test controller 219 may also utilize one or more processors to perform or initiate various tests and/or analyses involving the test packets and/or related responses communicated with SUT 218 via the established test session connections. In this example, device test controller 219 may send instructions to various modules or entities, e.g., testing applications 210, in programmable processing pipeline device 214 for controlling (e.g., to pause, (re)start, or stop) a test session of SUT 218 and/or DUT.

In some embodiments, device test controller 219 may interact with one or more testing applications 210. Testing applications 210 may represent software (stored in local memory) for configuring programmable processing pipeline device 214 or portions thereof. In some embodiments, testing applications 210 can include, but are not limited to, visibility applications, SDN controller applications, GUI and CLI applications, CPS generation applications, and test packet traffic generation applications for communicating with SUT 218 and/or a DUT.

In some embodiments, testing applications 210 may be used by device test controller 219 to execute a traffic generation functionality (e.g., a traffic generator) or CPS generation functionality (e.g., a CPS generator). For example, a traffic generator (not shown) may be any suitable entity or entities (e.g., software executing on a processor, an ASIC, an FPGA, or a combination of software, an ASIC, or an FPGA) for performing one or more aspects associated with generating or synthesizing test sessions, test cases, or related test packets to be communicated to SUT 218 via one or more test session connections. In this example, the traffic generator may be configured to utilize predefined test session templates or related data associated with the received hardware configuration image to generate one or more test cases and/or test sessions.

In some embodiments, testing applications 210 may include a reporting manager or module (not shown) and may be configurable by device test controller 219. For example, a reporting manager may be any suitable entity or entities (e.g., software executing on a processor, an ASIC, an FPGA, or a combination of software, an ASIC, or an FPGA) for collecting and reporting various information regarding the testing conducted over the test session connections. In this example, device test controller 219 and/or testing applications 210 may be configured to collect and/or generate performance reports or test analysis reports associated with SUT 218, e.g., by utilizing generated metrics or other information associated with test packets that are generated or passed through SUT 218, or the generated connections that are maintained by SUT 218.

In some embodiments, transmitting engine 216 may represent any suitable entity or component (e.g., devices, systems, or platforms) for receiving, processing, forwarding, and/or sending one or more test packets (e.g., sequence replay packets) or other messages via the established test session connections associated with the testing of SUT 218. In some embodiments, transmitting engine 216 may include a traffic generator (e.g., a hardware based packet blaster or a software based packet blaster) for generating various test packets (as defined by the hardware configuration data) that are destined for SUT 218 or for traversing SUT 218 (e.g., to reach destination receiving engine 217). In some embodiments, transmitting engine 216 may utilize a transmit port of programmable processing pipeline device 214 to communicate packets over the test session connections to SUT 218 and/or receiving engine 217.

Similarly, receiving engine 217 may represent any suitable entity or component (e.g., devices, systems, or platforms) for receiving, processing, forwarding, and/or sending via the established test session connections one or more test packets or other messages associated with testing SUT 218. In some embodiments, receiving engine 217 may include a traffic generator (e.g., a hardware based packet blaster or a software based packet blaster) for generating various test packets that are for responding to SUT 218 or for traversing SUT 118 (e.g., to reach destination transmitting engine 216) via the established connections 220.

In some embodiments, each of transmitting engine 216 and receiving engine 217 may include or utilize any suitable entity or components (e.g., one or more network interface cards (NICs), pluggable jacks, physical processors, transceiver modules, direct-attach cables (DACs) and/or other hardware) for sending or receiving packet communications via transmit/receive ports. For example, pipeline device 214 may use one or more multiple ports (e.g., physical connection ports) for receiving and sending various types of test packets or related data units, such as IP messages, Ethernet frames, Ethernet messages, packet data units (PDUs), datagrams, user datagram protocol (UDP) messages, TCP messages, IP version 4 (v4) messages, IP version 6 (v6) messages, stream control transmission protocol (SCTP) messages, real-time transport protocol (RTP) messages, or reliable data protocol (RDP) messages, messages using a tunneling protocol, and/or other data units.

In some embodiments, SUT 218 may represent any suitable entity or component (e.g., devices, systems, or platforms) for being tested by programmable processing pipeline device 214. In some embodiments, SUT 218 may include one or more servers connected via a data center switching fabric or a network. For example, SUT 218 may include a network node, a network switch, a network router, a network interface card, a packet forwarding device, or any other network device that can be communicatively coupled to programmable processing pipeline device 214.

In some embodiments, data storage element 212 may be any suitable entity or entities (e.g., a storage device, a non-transitory computer readable medium, or a storage system) for maintaining or storing hardware configuration information related to the establishment of test session connections through SUT(s) and DUT(s). Specifically, data storage element 212 may be configured to store the received hardware configuration data that can be used to implement test traffic models, test cases, test session data, and topology information for SUT 218. Data storage element 212 may also be used to store test-related information, such as performance metrics (e.g., statistics) associated with one or more aspects of SUT 218 and/or its associated processing pipeline. In some embodiments, data storage element 212 may be located at programmable processing pipeline device 214 (as shown), another device/node, or distributed across multiple platforms or devices.

It will be appreciated that FIG. 2 is for illustrative purposes and that various depicted entities, their locations, and/or their functions described above in relation to FIG. 2 may be changed, altered, added, or removed. For example, a computing device (e.g., a computer including at least one processor coupled to a memory) may include functionality of device test controller 219, transmitting engine 216, receiving engine 217, and testing applications 210.

Figure 3:
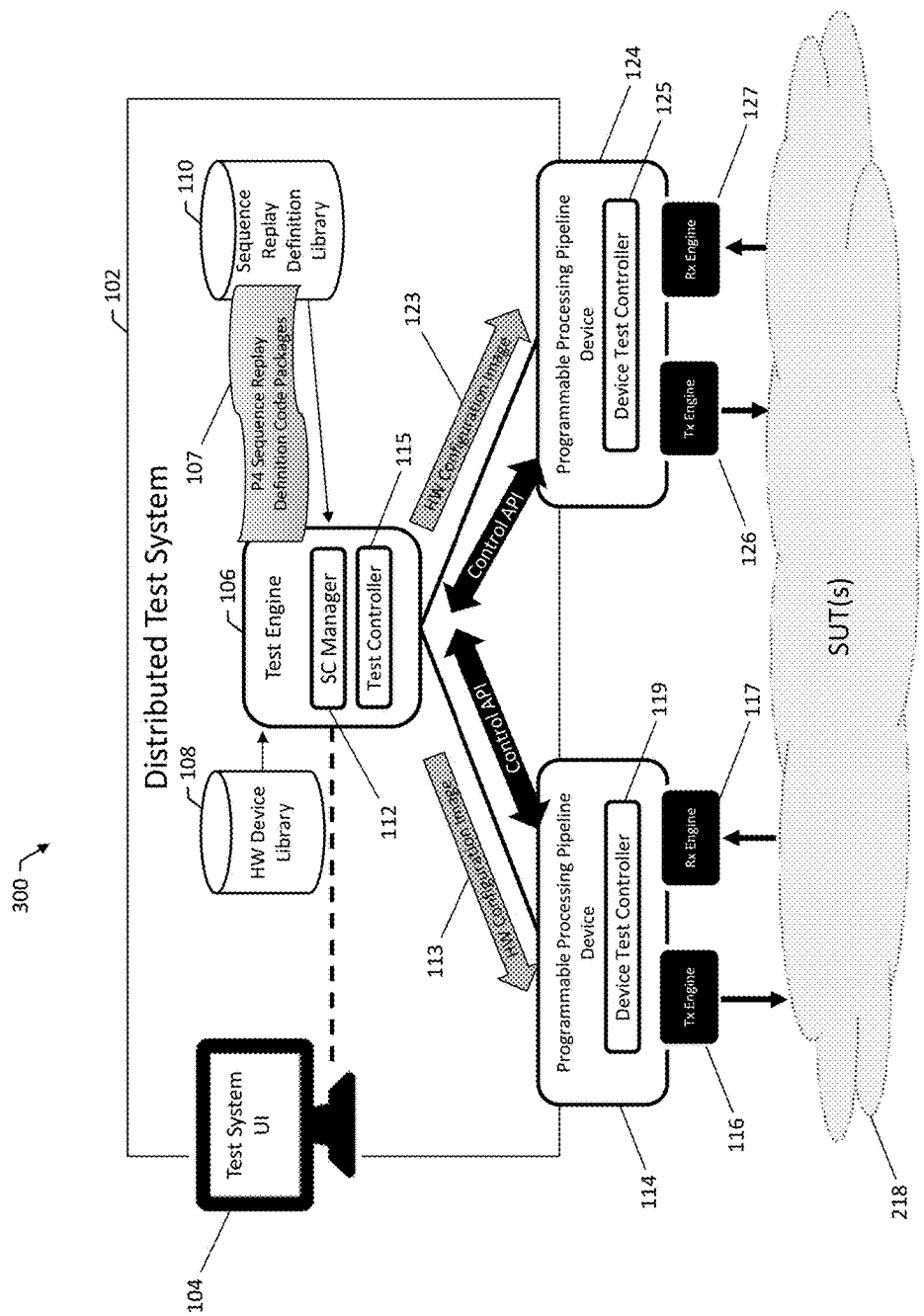
FIG. 3 is a block diagram illustrating an exemplary distributed test system deploying multiple test session connections.

FIG. 3 is a block diagram illustrating an exemplary distributed test system deploying multiple test session connections. In particular, test environment 300 includes the same elements and functions shown in FIG. 1 with the exception that distributed test system 102 has been configured to utilize multiple programmable processing pipeline devices to establish multiple processing pipelines with SUT 218. Namely, programmable processing pipeline device 114 is configured to establish a first test session connection between transmitting engine 116 and receiving engine 117 through SUT 218 and establish a second test session connection between transmitting engine 126 and receiving engine 127 through SUT 218 in the manner described above. Although FIG. 3 only depicts two programmable processing pipeline devices being used to establish test session connections through SUT 218, additional programmable processing pipeline devices may be utilized without departing from the scope of the disclosed subject matter.

Figure 4:
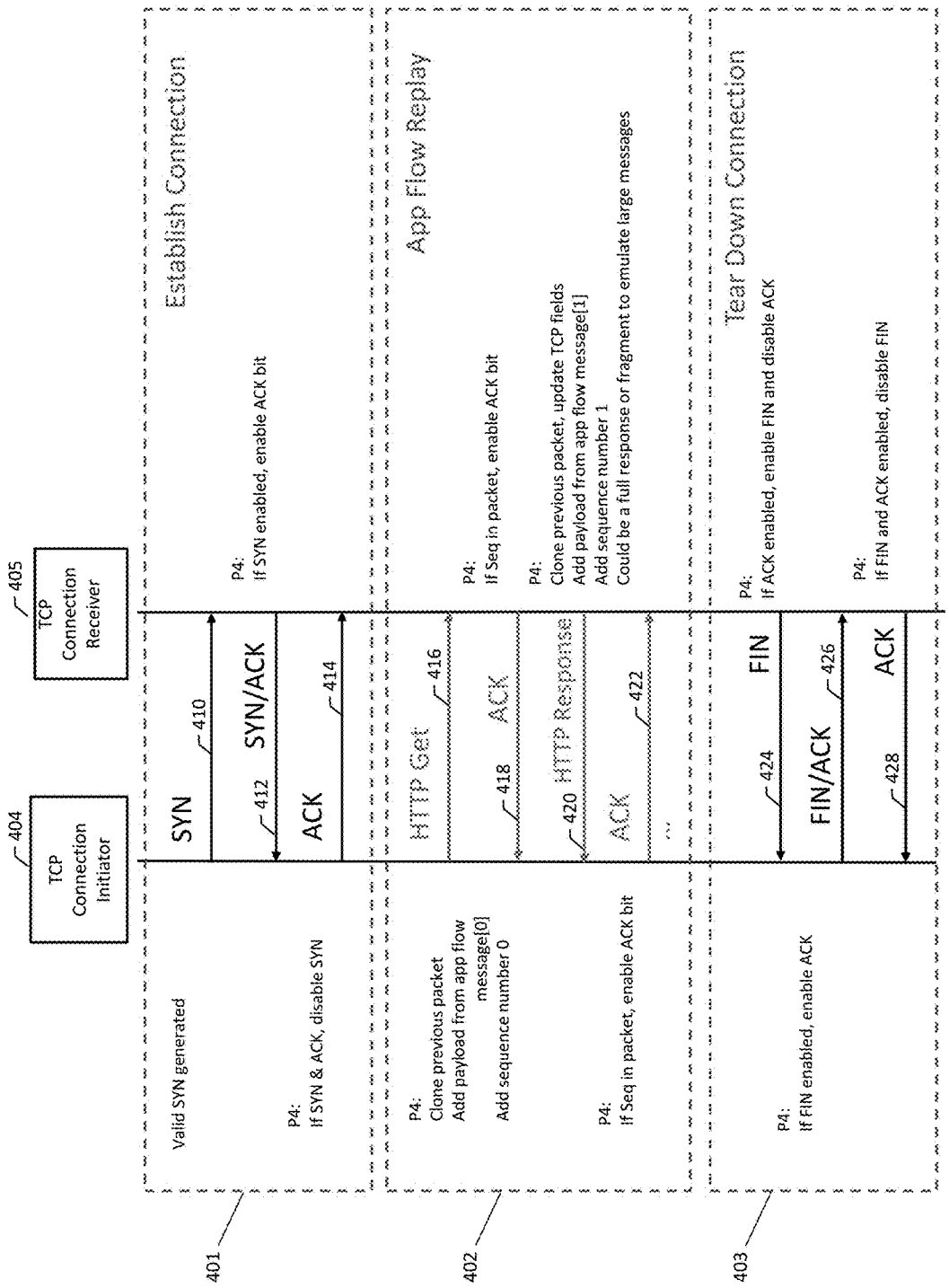
FIG. 4 is an exemplary application replay signaling diagram performed by programmable processing pipeline device.

FIG. 4 is an exemplary application replay signaling diagram illustrating an application replay operation that may be performed by a programmable processing pipeline device. In some embodiments, the programmable processing pipeline device can be provisioned with a hardware configurable image that is adapted to conduct an application replay sequence test (e.g., as defined by a sequence replay definition). The application replay sequence test may be conducted over a connection connects to the same or another programmable processing pipeline device through a SUT/DUT. Notably, this application replay sequence test can utilize a mix of various application flow definitions that are converted and/or compiled into P4 pipeline programming code, which is executed by the programmable processing pipeline device. Upon execution, traffic generation and/or connection formation tests may be executed on the programmable processing pipeline device to test one or more SUTs (and/or DUTs).

For example, the programmable processing pipeline device may be provisioned with hardware configuration data that configures the pipeline to establish one or more connections through a SUT and to define a packet replay sequence to be communicated over the established connections. The programmable processing pipeline device may then utilize its transmitting engine to operate as a TCP connection initiator 404 (or TCP initiating entity) and its receiving engine to operate as a TCP connection receiver 405 (or other TCP responding entity). In some embodiments, each of TCP connection initiator 404 and TCP connection receiver 405 includes programming hardware adapted to communicate replay packets associated with one or more TCP streams.

For example, in dashed box 401, a test connection is established between TCP connection initiator 404 and TCP connection receiver 405 via a SUT (not shown). Although TCP is used as an example herein, the subject matter described herein will work for other connection-oriented transport layer protocols, such as stream control transmission protocol (SCTP). TCP connection initiator 404 initially generates a valid SYN packet 410 and initiates a TCP connection by sending SYN packet 410 to TCP connection receiver 405. In response, TCP connection receiver 405 is configured to check if the SYN packet header contained a TCP flag (i.e., a designated bit) that indicates that SYN is enabled. If such a TCP flag is detected, TCP connection receiver 405 is configured to perform a "packet replay operation" that modifies and/or reuses (i.e., clones and/or replays the packet) the original SYN packet 410. Packet cloning or re-use can occur for each received packet by swapping source and destination packet header fields, updating packet content, and sending the packet back to its source. In one example, the packet replay operation involves i) cloning and/or copying the SYN packet 410, ii) changing or swapping the source MAC address and the destination MAC address in the modified SYN/ACK packet 412 with respect to the previously received SYN packet 410 (i.e., the source MAC address of SYN/ACK packet 412 will be used as the destination MAC address of SYN packet 410 and the destination MAC address of SYN/ACK packet 412 will be used as the source MAC address of SYN packet 410), iii) changing or swapping the source IP address and the destination IP address in the modified SYN/ACK packet 412 with respect to the previously received SYN packet 410 (i.e., the source IP address of SYN/ACK packet 412 will be used as the destination IP address of SYN packet 410 and the destination IP address of SYN/ACK packet 412 will be used as the source IP address of SYN packet 410), and iv) changing or swapping the source port identifier and the destination port identifier in the modified SYN/ACK packet 412 with respect to the previously received SYN packet 410 (i.e., the source port identifier of SYN/ACK packet 412 will be used as the destination port identifier of SYN packet 410 and the destination port identifier of SYN/ACK packet 412 will be used as the source port identifier of SYN packet 410). In some embodiments, the packet replay operation performed by the TCP connection receiver 405 further includes updating the TCP sequence numbers and acknowledgement numbers as needed in the SYN/ACK packet 412. Further, TCP connection receiver 405 is also configured to recalculate the checksum of SYN/ACK packet 412 prior to sending. After the packet replay operation is conducted, TCP connection receiver 405 sends SYN/ACK packet 412 (i.e., a replay/modification of SYN packet 410) with its ACK bit (i.e., TCP flag) enabled.

After receiving the SYN/ACK packet 412, TCP connection initiator 404 is configured to inspect a packet and determine if the SYN bit and ACK bit in the SYN/ACK packet 412 are each enabled. If such bits are detected, TCP connection initiator 404 is configured to disable the SYN bit in an ACK packet 414 that is directed to TCP connection receiver 405. Notably, TCP connection initiator performs the packet replay operation on the received SYN/ACK packet 412 to derive ACK packet 414. Specifically, TCP connection initiator 404 is configured to modify and/or reuse SYN/ACK packet 412 by i) changing or swapping of the source MAC address and the destination MAC address in the modified ACK packet 414 as compared to the previously received SYN/ACK packet 412 (i.e., in the same manner described above), ii) changing or swapping of the source IP address and the destination IP address in the modified ACK packet 414 as compared to the previously received SYN/ACK packet 412, and iii) changing or swapping of the source port identifier and the destination port identifier in the modified ACK packet 414 as compared to the previously received SYN/ACK packet 412. In some embodiments, the packet replay operation performed by the TCP connection initiator 404 further includes updating the TCP sequence numbers and acknowledgement numbers as needed in the ACK packet 414 as well as recalculating the packet's checksum. The sending of ACK packet 414 concludes the connection establishment stage indicated in dashed box 401.

In dashed box 402, the programmable processing pipeline device is configured to execute the application flow replay function. Notably, TCP connection initiator 404 is configured to clone or copy the previous packet (i.e., the ACK packet 414 sent to TCP connection receiver 405 in box 401). In particular, TCP connection initiator 404 adds the payload from the initial application flow message (e.g., message [0]) and add a sequence number of '0' to HTTP GET packet 416. Afterwards, TCP connection initiator 404 is configured to send HTTP GET packet 416 to TCP connection receiver 405. After receiving this packet, TCP connection receiver 405 is configured to inspect packet 416 and determine if a sequence number is indicated in the packet. If a sequence number is found, TCP connection receiver 405 is configured to enable the ACK bit (e.g., TCP flag) in the header of the ACK packet 418 that is to be sent to the TCP connection initiator 404. Although the following discloses the modification of TCP packet headers, other types of protocol packet headers may be modified in a similar manner without departing from the scope of the disclosed subject matter.

In another example, TCP connection initiator 404 and TCP connection receiver 406 may initiate and tear down test sessions without exchanging any application data over the test sessions. For example, TCP connection initiator 404 and TCP connection receiver 406 may exchange SYN, SYN/ACK, and ACK messages to initiate a connection and then exchange FIN, FIN/ACK, and ACK messages to tear down the connection. In a scalable CPS generation test, programmable processing pipeline device may implement multiple pairs of TCP connection initiators and receivers that establish a configurable number of connections per second though the SUT to test the connection processing capacity of the SUT. Because the programmable processing pipeline device can re-use packet fields from packets within a session and can re-use packet fields from one connection (after teardown) to establish another connection, the efficiency in performing the CPS generation test is increased over implementations where sessions and packets are created without packet header field swapping and re-use.

In addition, TCP connection receiver 405 is further configured to generate an HTTP response packet 420 that is cloned or copied from the previous packet (i.e., ACK packet 418). In particular, TCP connection receiver 405 may update the TCP header fields (i.e., conduct the "packet replay operation" described above) included in the copied HTTP response packet 420. In addition, TCP connection initiator 404 can also be configured to add the payload from the application flow definition and add a sequence number '1' to the generated HTTP response packet 420. The generated HTTP response packet 420 may be a full response message or a fragment that serves to emulate large-sized messages. After receiving HTTP response packet 420, TCP connection initiator 404 checks to determine if the sequence number is indicated in the packet. If so, TCP connection initiator 404 is configured to generate an ACK packet 422 and subsequently enable an ACK bit (e.g., TCP flag) in the ACK packet header. The communications between TCP connection initiator 404 and TCP connection receiver 405 via the SUT continues until TCP connection receiver 405 initiates the tear down connection procedure by sending a FIN packet 424 (see dashed box 403 in FIG. 4).

To initiate the tear down connection procedure, TCP connection receiver 405 determines if an ACK bit is enabled in the TCP header of the last ACK packet received (e.g., ACK packet 422). If the ACK bit is enabled, TCP connection receiver 405 generates a FIN packet 424 and enables the packet's FIN bit (e.g., TCP flag) and disables the ACK bit in the packet's TCP header. After receiving FIN packet 424 from TCP connection receiver 405, TCP connection initiator 404 detects the FIN bit/flag enabled in the FIN packet 424 and generates a FIN/ACK packet 426. In particular, TCP connection initiator 404 enables the ACK bit in the TCP header of FIN/ACK packet 426 and sends the packet to TCP connection receiver 405 via the SUT. After receiving the FIN/ACK packet 426, TCP connection receiver 405 is configured to determine if the FIN bit and the ACK bit are enabled in the TCP header of FIN/ACK packet 426. If so, TCP connection receiver 405 generates an ACK packet 428 that has the FIN bit/flag disabled in its TCP header. TCP connection receiver 405 then sends ACK packet 428 to TCP connection initiator 404 via the SUT.

Upon receiving the ACK packet 428, TCP connection initiator 404 is configured to recycle, copy, and/or clone the ACK packet 428 and use the content of ACK packet 428 to generate a SYN packet for a new connection. Notably, the TCP connection initiator and/or the programmable processing pipeline device of the disclosed subject matter does not expend time or resources generating an entirely new test packet to be communicated over the processing pipeline for each connection that is established. In some embodiments, the programmable processing pipeline device is configured to copy or clone the previously received packet, modify bit values (e.g., TCP flags) in the TCP packet header, and resend the modified packet without having to reconstruct the test packet from scratch.

At the conclusion of the transfer of test data for a given session, the associated test connection is not immediately terminated (as conducted in typical testing scenarios). Rather, after the exchange of packets for the connection has finished, the device test controller in the programmable processing pipeline device will start appending payload data to the test packets corresponding to the first message (after the 3-way handshake) from the sequence replay definition that is included in the delivered hardware configuration image. For the initial test packet header, the device controller may use any suitable initial sequence number that satisfies the requirements of the protocol used to transport the test packet. For TCP, the sequence number is a 32 bit value, and the initial sequence number in a TCP SYN packet used to create a connection is typically a randomly chosen value. After the 3-way handshake, the sequence numbers in transmitted TCP packets are equal to the previously transmitted sequence number plus the number of data bytes transmitted in the payload of the TCP packet. Once this TCP test packet sent by the transmitting engine is received by the receiving engine via the SUT, the device test controller and/or the receiving entity can examine the TCP test packet. Notably, the device test controller may exchange the payload of the message with a payload corresponding to the next message in the application flow (i.e., packet sequence replay). Thus, the next message in the application flow may involve a reply to the message (e.g., reply with a message [received sequence_number+1] that is sent back the test packet generator. It is appreciated that holding a received test packet in the processing pipeline and simply exchanging the contents of its payload with that of the next packet in the replay sequence is the fastest way the initiation and termination (e.g., handshake and tear down) of a connection can be achieved.

In some embodiments, the communications depicted in FIG. 4 can be conducted in parallel with other similar communications handled by the same programmable processing pipeline device. For example, a single programmable processing pipeline device can be configured to execute and manage over a hundred parallel processing pipelines being conducted contemporaneously. Notably, each of the processing pipelines configured in this manner can accommodate multiple connections through the SUT/DUT. In some embodiments, the processing pipeline may be configured by the device test controller to keep the associated connection open for a predefined period of time and subsequently send data at the expiration of the predefined time period or the expiration of a counter (e.g., a predetermined threshold count of received ACK and/or SYN/ACK messages is exceeded).

Figure 5:
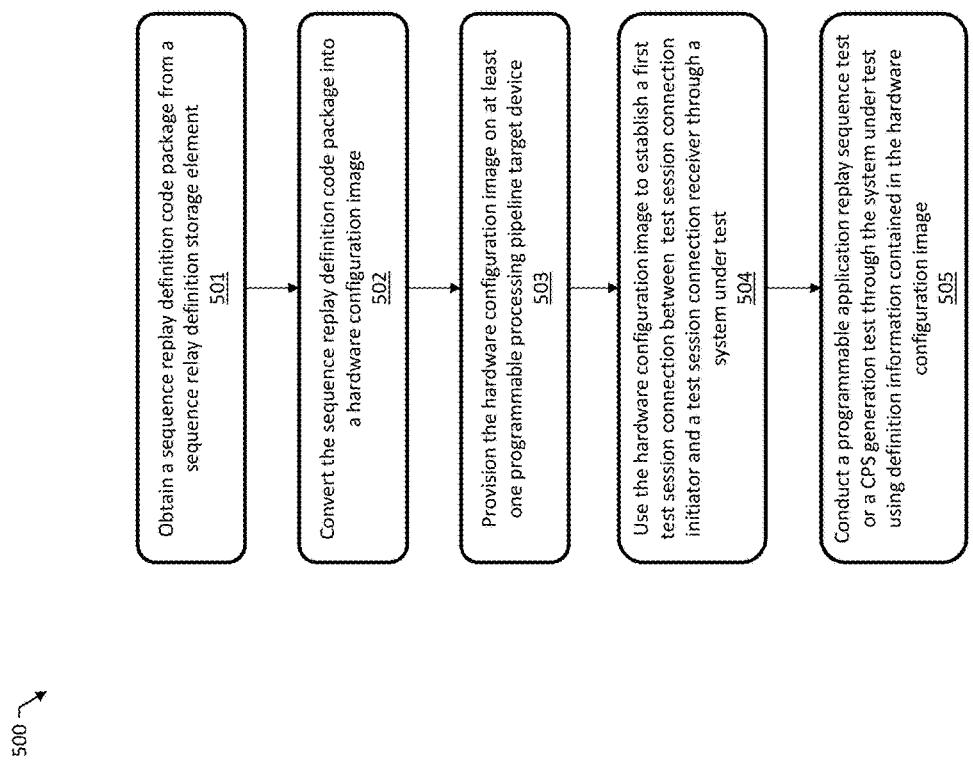
FIG. 5 is a flow diagram of an exemplary method for utilizing a programmable processing pipeline device to execute an application replay sequence test.

FIG. 5 is a flow chart illustrating an example process for utilizing a programmable processing pipeline device to execute an application replay sequence test according to an embodiment of the subject matter described herein. In some embodiments, method 500 depicted in FIG. 5 is an algorithm, program, or script stored in memory that when executed by a hardware-based processor performs the steps recited in blocks 501-505. In some embodiments, method 500 represents a list of steps embodied in a state machine (e.g., either via software code programming or via a set of rules) and/or logic of the test engine and/or programmable processing pipeline device.

In block 501, method 500 includes obtaining a sequence replay definition code package from a sequence relay definition storage element. In some embodiments, a source code manager (and/or a test engine) is configured to access a sequence reply definition storage element to obtain a sequence replay definition code package. For example, a test operator may provide instructions to the local test engine indicating a specific test (and/or associated processing pipeline) the programmable processing pipeline device is to conduct on a SUT or DUT. The source code manager in the test engine may then be configured to parse the user instructions and access (or send a request to) a sequence reply definition storage element containing various sequence replay definitions. P4 source code and associated sequence replay definitions are grouped together in a P4 sequence replay definition code package and sent to the requesting test engine.

In block 502, method 500 includes converting the sequence replay definition code package into a hardware configuration image file. In some embodiments, the source code manager (and/or a test engine) is configured to compile the source code include in the sequence replay definition code package (along with the sequence replay definition data) obtained from the sequence replay definition storage to produce the hardware configuration image.

In block 503, method 500 includes provisioning the hardware configuration image on at least one programmable processing pipeline device. In some embodiments, the test engine is configured to send the hardware configuration image to one or more programmable processing pipeline devices that have been designated to test (e.g., via application replay sequence test) a SUT/DUT. Notably, the hardware configuration image includes executable instructions and other information (e.g., sequence replay definitions) that are recognized by the device test controller on the programmable processing pipeline device(s). The hardware configuration image causes the programmable processing pipeline device to implement a test session connection initiator and a test session connection receiver. For example, the hardware configuration image may cause the programmable processing pipeline device to implement a TCP (or other transport layer) test session connection initiator and a TCP (or other transport layer) test session connection receiver.

In block 504, method 500 includes utilizing the hardware configuration image to establish a first test session connection between the test session connection initiator and the test session connection receiver through the SUT. In some embodiments, the device test controller is configured to execute the hardware configuration image and designate a transmitting engine and a receiving engine to respectively function as a test session connection initiator and a test session connection receiver, which establish a test session connection (such as a TCP or other transport layer connection) through the SUT or DUT.

In block 505, method 500 includes conducting a programmable application replay sequence test or a scalable CPS generation test via the through the SUT using definition information contained in the hardware configuration image. In some embodiments, the device test controller is configured to utilize the sequence replay definitions in the hardware configuration image to perform a test (e.g., programmable application replay sequence test) on the SUT/DUT. Notably, the associated test packets are communicated (in accordance with the sequence replay definitions) between the transmitting engine and the receiving engine through the SUT being tested. If a scalable CPS generation test is implemented, the transmit and receive engines of the programmable processing pipeline device may initiate a configurable number of test session connections through the SUT/DUT using the mechanism described above with respect to FIG. 4.

In another example, conducting the application replay test or the CPS generation test may include impairing the traffic flows, for example, by generating and sending malformed or out of order packets.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method comprising:
obtaining a sequence replay definition code package from a sequence relay definition storage element;
converting the sequence replay definition code package into a hardware configuration image;
provisioning the hardware configuration image on at least one programmable processing pipeline device, wherein the hardware configuration image causes the at least one programmable processing pipeline device to implement a test session connection initiator and a test session connection receiver;
utilizing the hardware configuration image to establish a first test session connection between the test session connection initiator and the test session connection receiver through a system under test (SUT); conducting a programmable application replay sequence test or a scalable connection per second (CPS) generation test connection through the SUT using definition information contained in the hardware configuration image; and
initiating a second test session connection between the test session connection initiator and the test session connection receiver via the SUT after the first test session connection is terminated by generating a packet for initiating the second test connection using at least a portion of a test packet that terminates the first test session connection.

2. The method of claim 1 wherein the at least one programmable processing pipeline device is configured to log and report results of the programmable application replay sequence test.

3. The method of claim 1 wherein the sequence replay definition code package includes P4 source code or NPL source code.

4. The method of claim 1 wherein conducting the programmable application replay sequence test or the scalable CPS generation test includes modifying source address information and destination address information in a test packet communicated between the test session connection initiator and the test session connection receiver in the at least one programmable processing pipeline device prior to the test packet being communicated by either the test session connection initiator or the test session connection receiver through the SUT via the first test session connection.

5. The method of claim 4 wherein the source address information includes one or more of source media access control code (MAC) address information, source Internet protocol (IP) address information, and/or transport layer port information and the destination address information includes one or more of destination MAC address information, destination IP address information, and/or destination transport layer port information.

6. The method of claim 4 wherein conducting the programmable application replay sequence test or the scalable CPS generation test includes updating a transport layer packet sequence number and a transport layer packet acknowledgement number in the test packet and recalculating a checksum value in the test packet.

7. The method of claim 1 wherein the first test session connection is modified by control commands or instructions issued from a test controller via a control interface associated with the at least one programmable processing pipeline device.

8. The method of claim 1 wherein the at least one programmable processing pipeline device includes a switching application-specific integrated circuit (ASIC) or a programmable switching chipset.

9. A system comprising:
a distributed test system platform including at least one processor and a memory;
a test engine stored in the memory and when executed by the at least one processor is configured to:
obtain a sequence replay definition code package from a sequence relay definition storage element;
convert the sequence replay definition code package into a hardware configuration image; and
provision the hardware configuration image; and
at least one programmable processing pipeline device configured to:
receive the hardware configuration image from the test engine, wherein the hardware configuration image causes the at least one programmable processing pipeline device to implement a test session connection initiator and a test session connection receiver;
utilize the hardware configuration image to establish a first test session connection between the test session connection initiator and the test session connection receiver through a system under test (SUT);
conduct a programmable application replay sequence test or a scalable connection per second (CPS) generation test through the SUT using definition information contained in the hardware configuration image; and
initiate a second test session connection between the test session connection initiator and the test session connection receiver via the SUT after the first test session connection is terminated by generating a packet for initiating the second test connection using at least a portion of a test packet that terminates the first test session connection.

10. The system of claim 9 wherein the at least one programmable processing pipeline device is configured to log and report results of the programmable application replay sequence test or a scalable CPS generation test.

11. The system of claim 9 wherein the sequence replay definition code package includes P4 source code or NPL source code.

12. The system of claim 9 wherein the at least one programmable processing pipeline device is further configured to modify source address information and destination address information in a test packet communicated between the test session connection initiator and the test session connection receiver in the at least one programmable processing pipeline device prior to the test packet being communicated by either the test session connection initiator or the test session connection receiver through the SUT via the first test session connection.

13. The system of claim 12 wherein the source address information includes one or more of source media access control code (MAC) address information, source Internet protocol (IP) address information, and/or source transport layer port information and the destination information includes one or more of destination MAC address information, destination IP address information, and/or destination transport layer port information.

14. The system of claim 13 wherein the at least one programmable processing pipeline device is further configured to update a transport layer packet sequence number and a transport layer packet acknowledgement number in the test packet and recalculating a checksum value in the test packet.

15. The system of claim 9 wherein the first test session connection is modified by control commands or instructions issued from a test controller via a control interface associated with the at least one programmable processing pipeline device.

16. The system of claim 9 wherein the at least one programmable processing pipeline device includes a switching application-specific integrated circuit (ASIC) or a programmable switching chipset.

17. A non-transitory computer readable medium comprising computer executable instructions embodied in the non-transitory computer readable medium that when executed by at least one processor of at least one computer causes the at least one computer to perform steps comprising:
obtaining a sequence replay definition code package from a sequence relay definition storage element;
converting the sequence replay definition code package into a hardware configuration image;
provisioning the hardware configuration image on at least one programmable processing pipeline device, wherein the hardware configuration image causes the programmable processing pipeline device to implement a test session connection initiator and a test session connection receiver;
utilizing the hardware configuration image to establish a first test session connection between the test session connection initiator and the test session connection receiver through a system under test (SUT); conducting a programmable application replay sequence test or a scalable connection per second (CPS) generation test through the SUT using definition information contained in the hardware configuration image; and
initiating a second test session connection between the test session connection initiator and the test session connection receiver via the SUT after the first test session connection is terminated by generating a packet for initiating the second test connection using at least a portion of a test packet that terminates the first test session connection.

18. The non-transitory computer readable of claim 17 wherein conducting a programmable application replay sequence test or a scalable CPS generation test includes modifying source address information and destination address information in a test packet communicated between the test session connection initiator and the test session connection receiver in the at least one programmable processing pipeline device prior to the test packet being communicated by either the test session connection initiator or the test session connection receiver through the SUT via the processing pipeline.

* * * * *